United States Patent
Rose et al.

[19]

[11] Patent Number: 5,967,840
[45] Date of Patent: Oct. 19, 1999

[54] COMBINED POWER AND FIBER OPTIC COMMUNICATION PLUG AND RECEPTACLE

[75] Inventors: William J. Rose, Woodbury; Steve Campolo, Valley Stream, both of N.Y.

[73] Assignee: Leviton Manufacturing Co., Inc., Little Neck, N.Y.

[21] Appl. No.: 09/017,983

[22] Filed: Feb. 3, 1998

[51] Int. Cl.[6] .................................................. H01R 33/945
[52] U.S. Cl. .............................. 439/577; 439/246; 385/76
[58] Field of Search ................................ 439/577, 246–9; 385/76–7, 84, 88–89, 90, 92, 139

[56] References Cited

U.S. PATENT DOCUMENTS

| | | | |
|---|---|---|---|
| 4,767,181 | 8/1988 | McEowen | 439/577 |
| 5,242,315 | 9/1993 | O'Dea | 439/577 |
| 5,345,520 | 9/1994 | Grile | 439/188 |

*Primary Examiner*—Lincoln Donovan
*Attorney, Agent, or Firm*—Paul J. Sutton

[57] ABSTRACT

A combined power and fiber optic cable can be terminated and connected to a second such cable. The male plug, in addition to its two male blades and hollow ground pin, carries a fiber optic conductor spring mounted to the plug. The receptacle has the normal female contact and ground pin contact to receive the blades and ground pin, respectively. The receptacle further carries a fiber optic conductor. When the male plug and receptacle are joined the electrical circuit between electrical conductors joined to the plug and receptacle are closed. In addition the end faces of the fiber optic conductors within the plug and receptacle are joined. The spring allows the fiber optic conductor of the plug to stay in intimate contact with the fiber optic conductor of the receptacle.

11 Claims, 5 Drawing Sheets

COMBINED POWER AND FIBER OPTIC COMMUNICATION PLUG AND RECEPTACLE

BACKGROUND OF THE INVENTION

1. Field of the Invention

The invention is directed to electrical plugs and receptacles and more particularly to a plug and receptacle system that can terminate both electrical conductors and a fiber optic conductor.

2. Description of the Prior Art

At present, no device is known of which can connect or terminate both electrical power conductors and a fiber optic communications conductor at the same time. Presently the electrical conductors are connected or terminated in one wall box and the communication fiber optic conductor is terminated or connected in a second wall box. If a number of devices require the connection or termination of both electrical conductors and communication fiber optic conductors, then a number of wall boxes would be required. This makes the wiring between the devices and the wall boxes extensive and unwieldy.

SUMMARY OF THE INVENTION

The invention provides a combination plug and receptacle which can connect or terminate the electrical conductors and the optical fiber of a combined cable comprising electrical power conductors and a communications fiber optic conductor. The power conductors are joined in their usual manner but provision is made for the fiber optic conductor. A tube is placed in the body member of the receptacle with a bore therein to receive a first fiber optic conductor. Means are provided to fix the position of the first fiber optic conductor with respect to a front face of the receptacle. Placed within the hollow ground pin of the plug is a second fiber optic conductor. A compression spring is positioned about the second fiber optic conductor so that the second fiber optic conductor can be displaced by contact with the interior end of the first fiber optic conductor and maintain intimate contact between the end faces of the first and second fiber optic conductors. The hollow ground pin moves over a portion of the outer surface of the tube and is engaged by the ground contact. It is an object of this invention to provide a novel combined power and fiber optic communication plug and receptacle.

It is an object of this invention to provide a novel combined power and fiber optic communication plug and receptacle which when joined terminates both the power conductors and the fiber optic conductors.

It is another object of this invention to provide a novel combined power and fiber optic communication plug and receptacle which can be joined to terminate the electrical conductors only.

It is still another object of this invention to provide a novel combined power and fiber optic communication plug wherein the fiber optic communication conductor is mounted in the hollow ground pin.

It is yet another object of this invention to provide a novel combined power and fiber optic communication plug wherein the fiber optic communication conductor is spring mounted in the hollow ground pin to permit the end of the fiber optic conductor to move with respect to the longitudinal axis of the plug.

It is still another object of this invention to provide a novel combined power and fiber optic communication receptacle having provision to position and hold a fiber optic conductor.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWINGS

In the drawing in which similar elements are give similar reference characters.

DESCRIPTION OF THE PREFERRED EMBODIMENT

Figure 1:
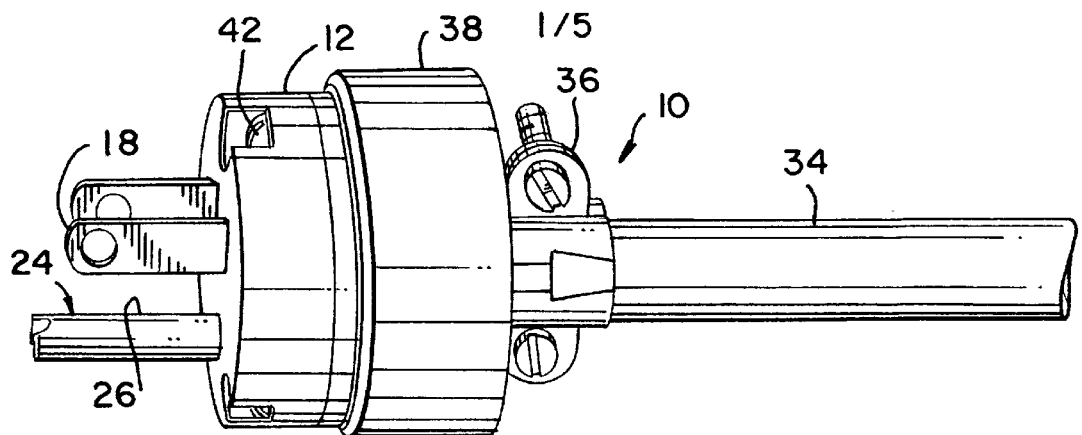
FIG. 1 is a side elevational view of dead front armored plug as shown in the prior art.
Figure 2:
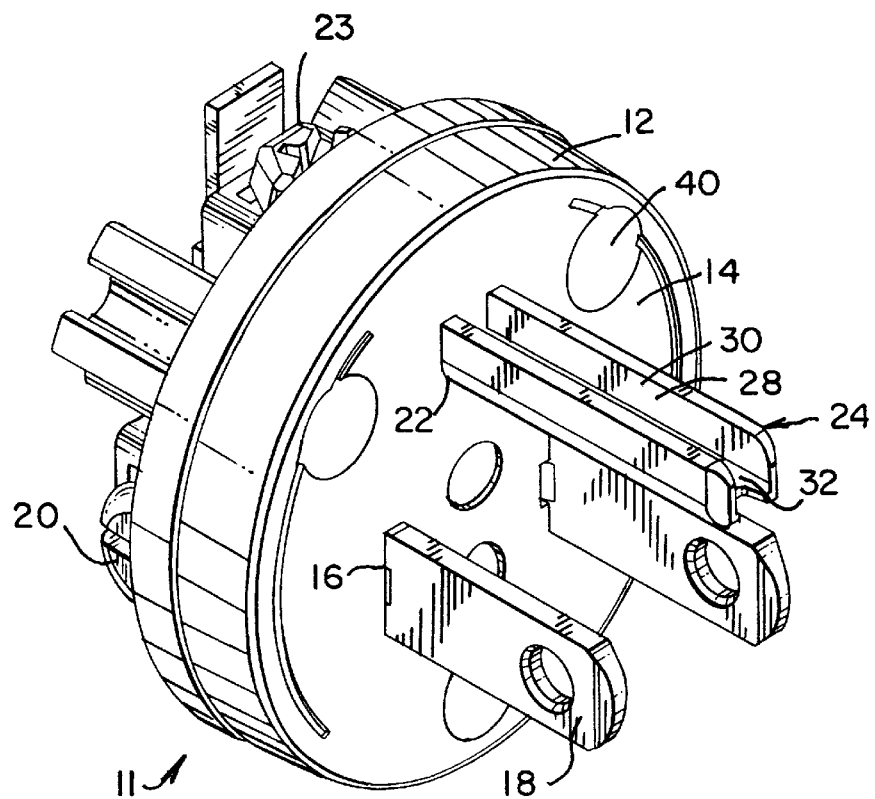
FIG. 2 is a front, left perspective view of the plug of FIG. 1 with the armored shell removed and the plug inverted.

Turning now to FIGS. 1 and 2, there is shown a dead front armored plug 10 constructed according to the prior art. Plug 10 has a body portion 12 with a front face 14 having two blade apertures 16 through which extend two male blades 18. A terminal screw 20 (only one of which is visible in FIG. 2) is used to couple the bared end of a conductor (not shown) to one of the male blades 18. A ground pin 24 extends from a ground aperture 22 and is coupled to a ground conductor (not shown) by terminal screw 23. The ground pin is generally hollow and may be cylindrical with an open or closed distal end. Ground pin 24 is U-shaped with an open distal end and a rounded outside surface 26 and a channel 28 between the walls 30 and floor 32. Although the arrangement of the blades 18 and the ground pin 24 conforms to a standard National Electrical Manufacturers Association (NEMA) 5–15 plug, the invention has equal applicability to most of the other NEMA standards which use two or more male blades arranged in different positions and with different orientations and a ground pin. The plug 10 of FIG. 1 is shown attached to a multi-conductor cable 34, the individual conductors of which are connected to the male blades 18 and ground pin 24 as is well known in the art. A strain relief 36 is made to grip the cable 34 to prevent forces applied to the cable 34 along its length from effecting the connection of cable 34 with plug 10. The strain relief 36 can handle a wide range of cable diameters to be used with the plug 10. The connections of the cable to the individual terminal screws, such as 20 and 23 of plug 10 are protected by armor section 38 which is joined to body portion 12 by three fasteners 42 extending through apertures 40 in body portion 12 into armor section 38.

Figure 3:
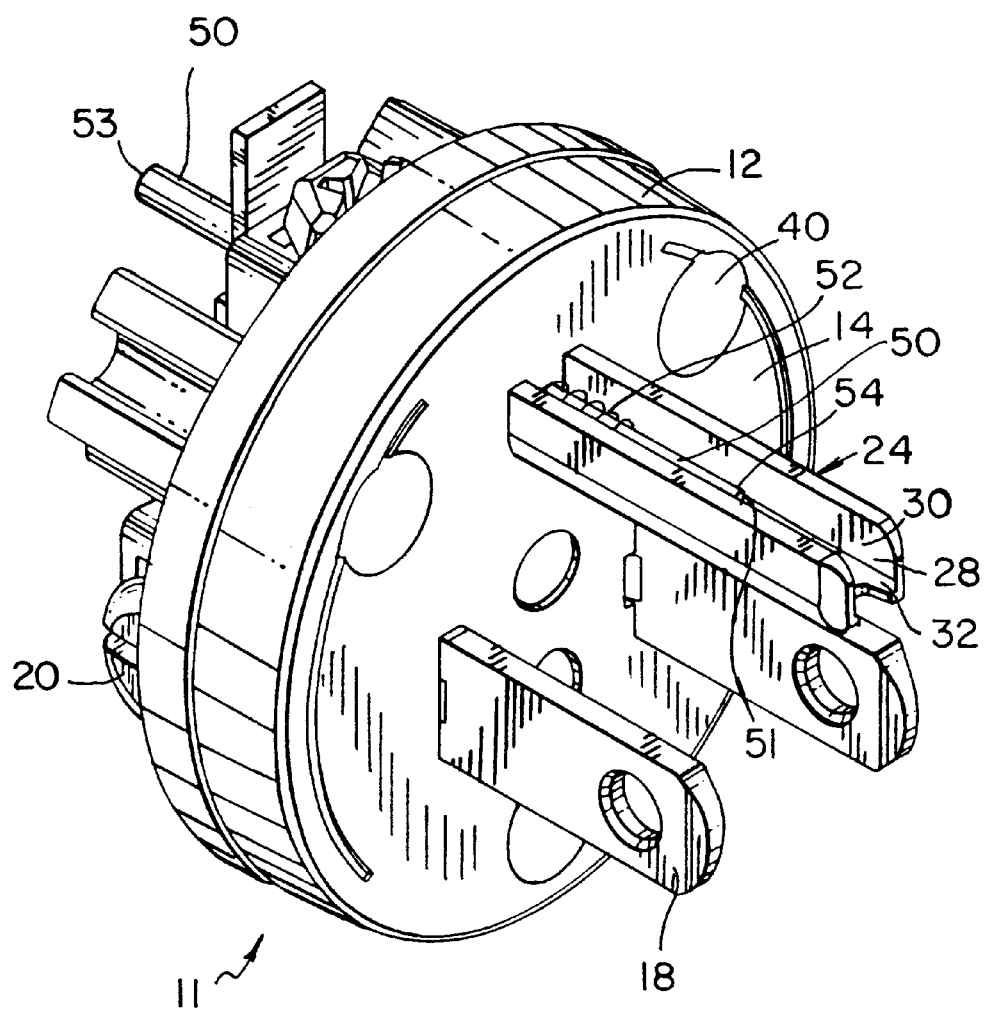
FIG. 3 is a front, left perspective view of the plug of FIG. 2 showing the mounting of a fiber optic conductor in the hollow ground pin according to the concepts of the invention.
Figure 7:
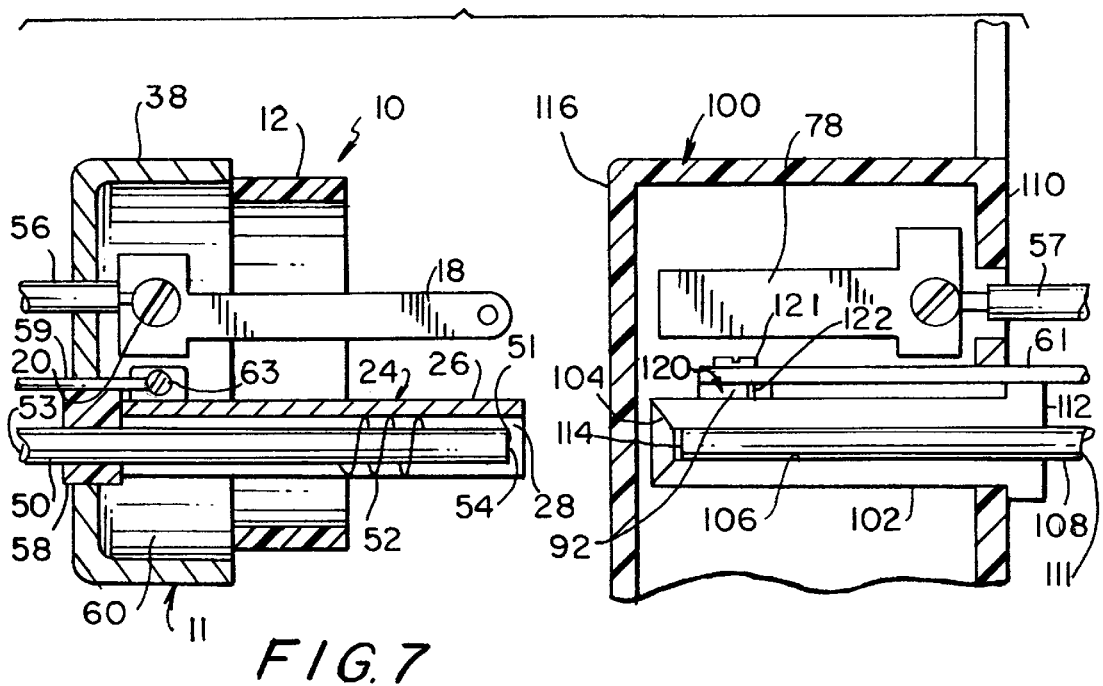
FIG. 7 is a side elevational view, in section, of a simplified plug and receptacle constructed in accordance with the concepts of the invention and showing the plug and receptacle in their unmated state.
Figure 8:
FIG. 8 is a side elevational view, in section of the plug and receptacle of FIG. 7 fully mated.
Figure 8:
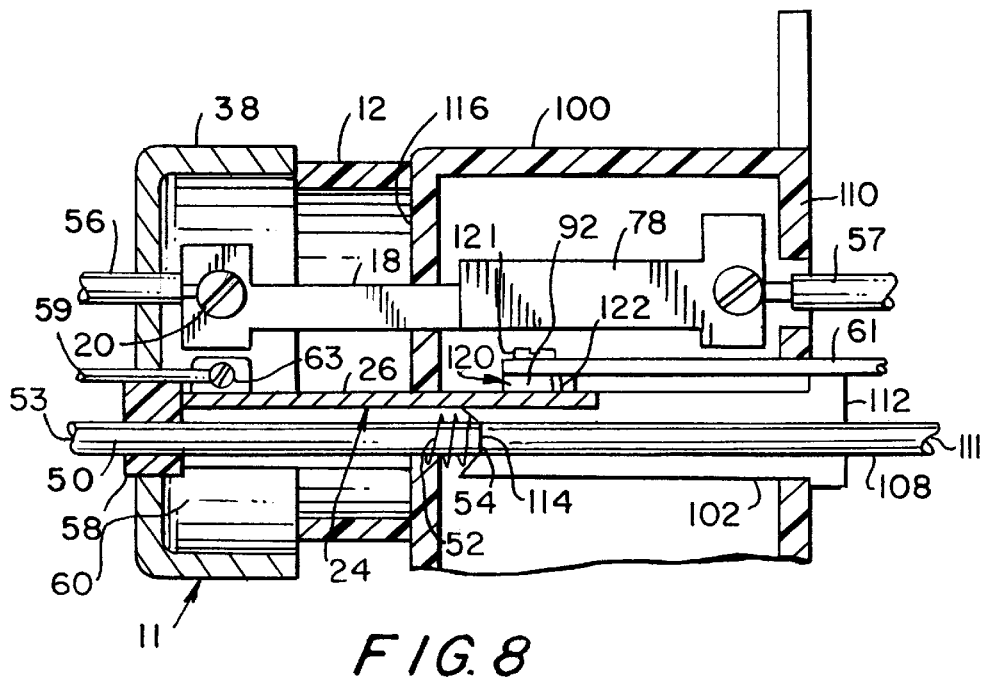

FIGS. 3, 7 and 8 show the plug body portion 12 of a plug 11 with a first fiber optic conductor 50 having a third end 51 and a fourth end 53, the optic conductor 50 having its third end 51 extending from a rear face of the body member 12, through body member 12 and out along the channel 28 of the ground pin 24. The fourth end 53 of optic conductor 50 is coupled to a device (not shown). A compression spring 52 is coupled to the fiber optic conductor 50 and to the front face 14 of body portion 12. As will be described below, when fiber optic conductor 50 is made to engage the fiber optic conductor 108 in the receptacle 100, fiber optic conductor 50 may be displaced towards the rear of body portion 12 compressing the spring 52. The spring 52 will then urge the end face 54 at the third end 51 of fiber optic conductor 50 into intimate contact with the end face 114 at the fifth end 109 of the fiber optic conductor 108 in the receptacle 100. The sixth end 111 of fiber optic conductor 108 is couple to a device (not shown). The conductor 56 and the fiber optic conductor 50 are shown without the outer cable jacket or the strain relief 36 for the sake of clarity. A fiber optic grip 58 holds the fiber optic conductor 50 where it enters the armor shell 38. The fiber optic conductor 50 is able to bow within cavity 60 in the armor shell 38 as the third end 57 of fiber optic conductor 50 is moved towards the rear face of the armor shell 38. The bowing will be slight and will not effect light transmission. The bowed portion of fiber optic conductor 50 will tend to straighten out as the end face 54 of the fiber optic conductor 50 is moved towards front face 14 of receptacle body portion 12 by spring 52 which also insures an intimate contact between end face 54 of fiber optic conductor 50 and the end face 114 of the fiber optic conductor in the receptacle 100.

Figures 4, 5:
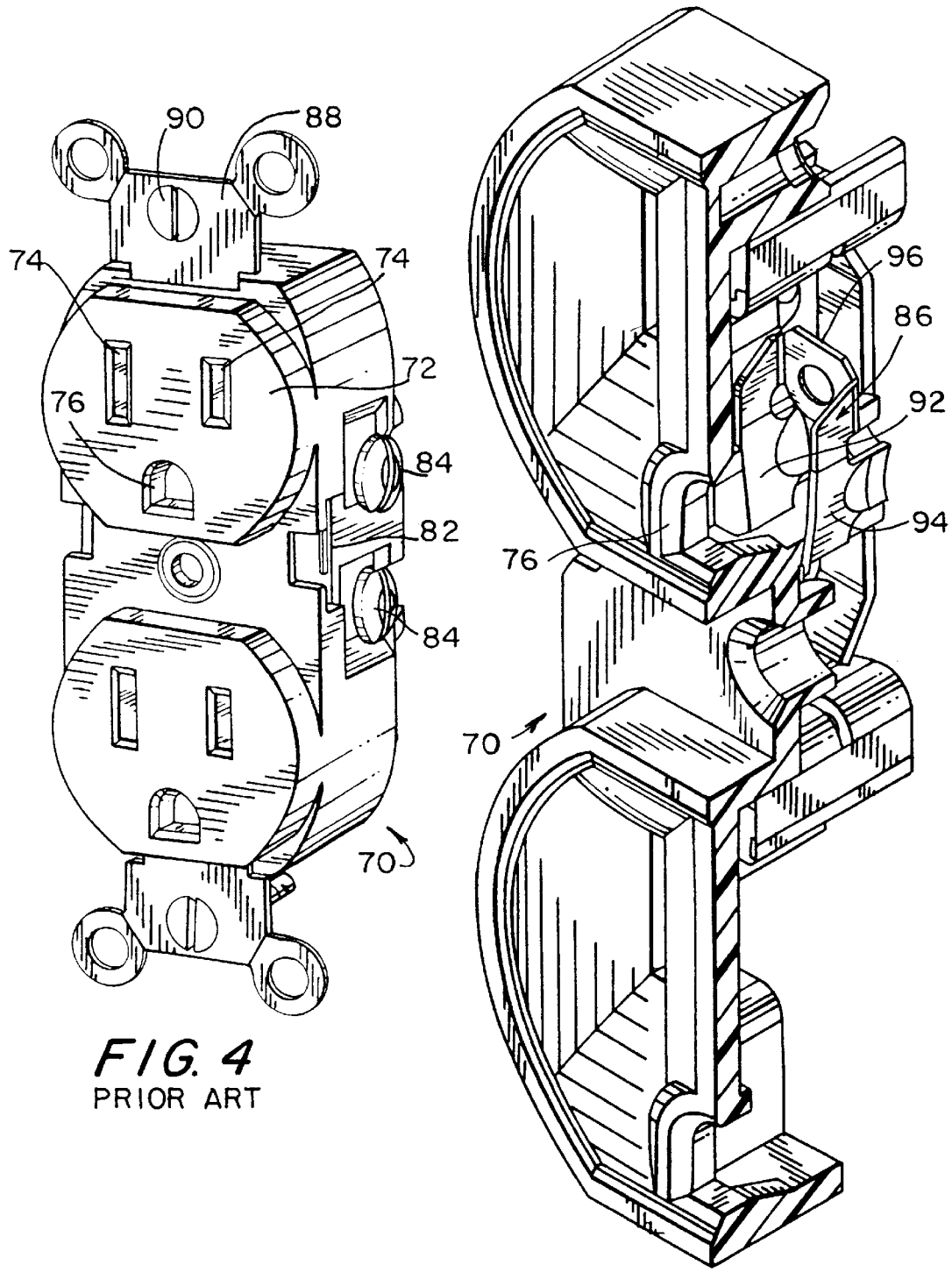
FIG. 4 is a front, right perspective view of a receptacle according to the prior art.
FIG. 5 is a front, right perspective view, partially in section, of a first portion of the receptacle of FIG. 4.

FIGS. 4 and 5 show a prior art receptacle 70 of the duplex type (can accept two plugs 10) and having two sets of two blade apertures 74 and a ground pin aperture 76 in a front face 72. The arrangement of the blade apertures 74 and the ground aperture 76 conforms to the NEMA 5–15 standard. It should be understood that other NEMA standard blade and ground aperture configurations and arrangements can be employed and will match those of the plug. Female contacts 78 are positioned behind the blade apertures 74 (see FIGS. 7 and 8) to receive the male blades 18. A contact 86, arranged to engage the surface 26 of ground pin 24, is shown in FIG. 5. The female contacts 78 and the covers of the individual sections of the receptacle 70 have been omitted for the sake of clarity. A jumper 82 connects the hot terminals 84 of the receptacle sections and will be left in place to couple a common hot lead (not shown) or removed to use a separate hot lead for each of the hot terminals 84. A similar arrangement for the neutral terminals (not shown) is on the opposite side wall of receptacle 70. A ground lead (not shown) is coupled to the terminal screw of ground contact 86. Mounting strap 88 permits the mounting of receptacle 70 in and to a gang box (not shown) by means of fasteners 90 extending through each of two apertures. Ground contact 86 has two conductive flaps 92 and 94 joined by bridge 96. The flaps 92 and 94 engage the sides of the ground pin 24 to couple it to the ground lead.

Figure 6:
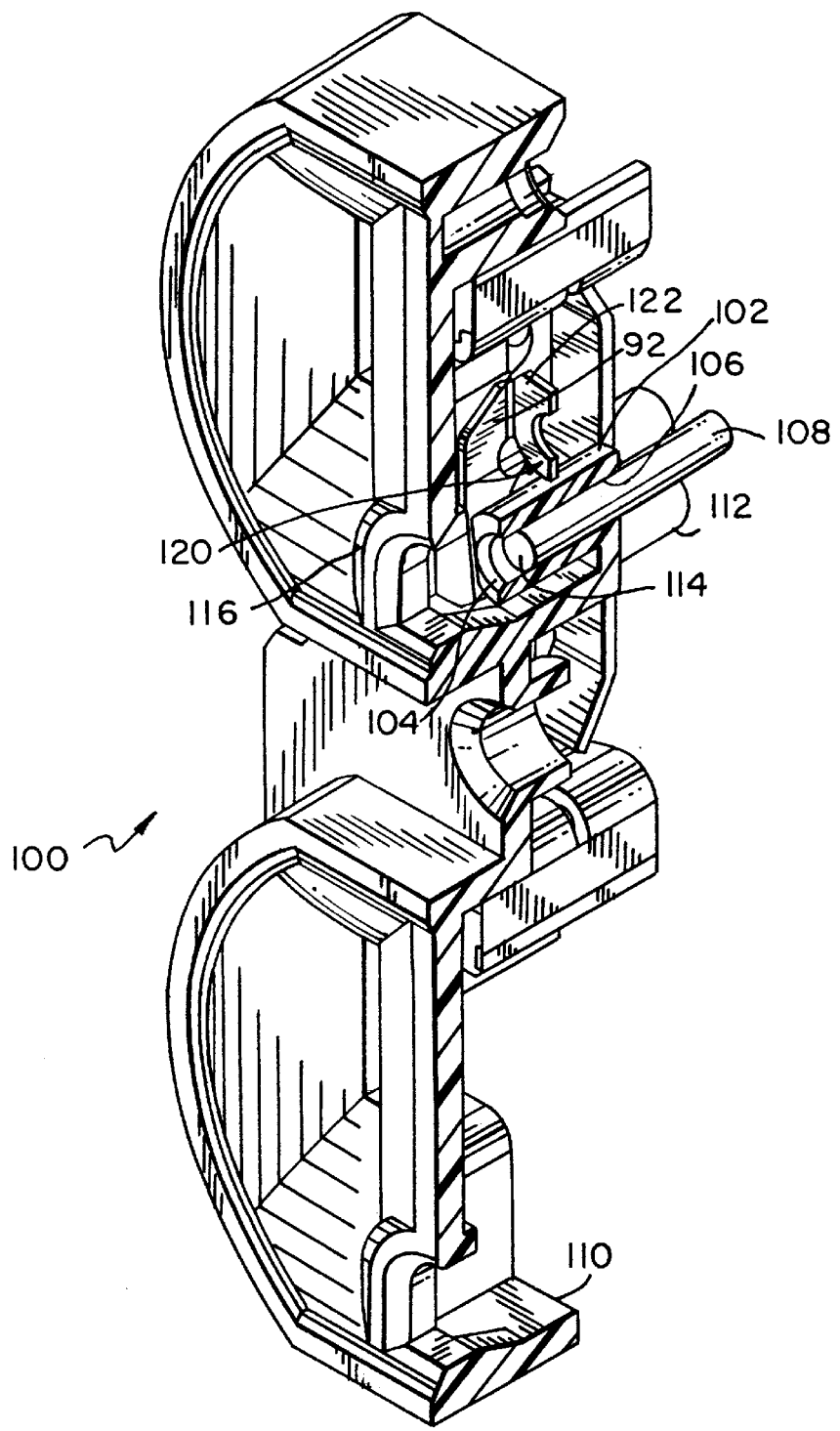
FIG. 6 is a front, right perspective view, partially in section, of a first portion of a receptacle constructed in accordance with the concepts of the invention.

Turning now to FIG. 6, there is shown a modified receptacle 100 constructed in accordance with the concepts of the invention. To the receptacle 70 of FIG. 5 has been added a tube 102 having an inwardly tapered entry 104. The bore 106 of tube 102 is dimensioned so as to accept a fiber optic conductor 108 therein. A clamp 112 coupled to the rear face 110 of receptacle 100 (see FIGS. 7 and 8) holds the end face 114 adjacent the fifth end 109 of fiber optic conductor 108 a preset distance from the front face 116 of the receptacle 100. The ground contact 120 is similar to a portion of ground contact 86. Flap 92 remains the same but flap 94 has been eliminated and bridge 96 has been cut at its center to provide a bridge 122. Contact is made with a ground pin 24 along one side by flap 92 and along its top edge 26 by bridge 122.

Referring to FIGS. 7 and 8, the operation of the combined power and fiber optic communications plug 11 and receptacle 100 is set forth. As a plug 11 is advanced towards receptacle 100 the blades 18 enter blade apertures 74 and the ground pin 24 enters the ground pin aperture 76. One of the blades 18 is coupled to electrical conductor 56 by terminal screw 20, the second blade 18 is also terminated to a conductor by a terminal screw but not shown in FIGS. 7 and 8. Ground pin 24 is coupled to ground conductor 59 by terminal screw 63. In a similar manner, a female contact 78 is coupled to electrical conductor 57 and the second female contact 78 is similarly coupled to an electrical conductor but not shown in FIGS. 7 and 8. A ground conductor 61 is coupled to contact 120 by a terminal screw 121.

Female contacts 78 are often bifurcated having two spring arms, each of which contacts one of the parallel side walls of blade 18, to make electrical contact and close the circuit between conductors 56 and 57. The ground pin 24 positions channel 28 over the outer surface of tube 102 on three sides and in contact with ground contact 120. A ground path is established between ground conductor 59 terminal screw 63, the ground pin 24, ground contact 120, the terminal screw 121 to ground conductor 61. This arrangement is similar to many plug/receptacle devices on the market. Because of this, the plug 11 and receptacle 100 can be used to connect and terminate two conductor with ground cable in those cases where the fiber optic cable is not present or is not in use.

The end face 114 of fiber optic conductor 108 is a fixed distance $d_1$ from front face 116, fixed by clamp 112. The end face 54 of fiber optic conductor 50 is movable to a limited degree and placed in channel 28 so that it is spaced from the leading end of ground contact 24 by a distance $d_2$ where $d_2$ is less than $d_1$. The end of fiber optic conductor 50 enters the tube 102 and is self-centered by the inwardly tapered entry 104 so that end face 54 of fiber optic conductor 50 comes into alignment with and contacts end face 114 of fiber optic conductor 108. The contact between end faces 54 and 114 causes fiber optic conductor 50 to move towards the left of plug 11 and bow a small amount into cavity 60. Spring 52 urges the end face 54 of fiber optic conductor 50 into a firm and intimate contact with end face 114 of fiber optic 108. Spring 52 continues to urge the end face 54 into contact with end face 114 as long as plug 11 and receptacle 100 are joined. When plug 11 is separated from receptacle 100, spring 52 returns the end face 54 to its initial position.

While there have been shown and described and pointed out the fundamental novel features of the invention as applied to the preferred embodiment, as is presently contemplated for carrying them out, it will be understood that various omissions and substitutions and changes of the form and details of the device illustrated and in their operation may be made by those skilled in the art, without departing from the spirit of the invention.

We claim:
1. A connection system including a plug and a receptacle for composite cable having electrical conductor and fiber optic components comprising:
   a) a receptacle body member having at least two blade apertures and a ground pin aperture in a first face;
   b) at least two female contacts, one for each of said at least two blade apertures and each positioned adjacent an associated one of said blade apertures and a further ground contact positioned adjacent said ground pin aperture;

c) a tube in said receptacle body member, said tube having an outside surface, a first end set back from a front face of said receptacle body member, and a second end and a bore extending through said tube from said first end to said second end, said ground contact positioned adjacent said tube outside surface;

d) a first optical fiber having a third end with a first end face at said third end and a fourth end, said first optical fiber positioned in said bore of said tube with said third end positioned in said bore of said tube with said third end positioned adjacent said first face of said receptacle body member;

e) a plug member having at least two male blades, one for each of said at least two blade apertures in said receptacle body member, and a hollow ground pin extending from a second face of said plug member, said at least two male blades and said hollow ground pin so dimensioned and arranged to enter said at least two blade apertures and said ground pin aperture in said receptacle body member and make electrical contact with associated at least two female contacts and ground contact in said receptacle body member; and;

f) a second optical fiber having a fifth end with a second end face at said fifth end and a sixth end, said second optical fiber positioned in said hollow ground pin with said fifth end of said second optical fiber set back from a free end of said ground pin whereby when said plug member is plugged into said receptacle body member, said at least two male blades each engage associated at least two female contacts and said hollow ground pin engages said ground contact and said first end face of said first optical fiber is positioned in contact with said second end face of said second optical fiber.

2. A connection system, as defined in claim 1, further comprising spring means about said second optical fiber adjacent said fifth end to urge said second end face at said fifth end of said second optical fiber into intimate contact with said first end face at said third end of said first optical fiber.

3. A connection system, as defined in claim 2, wherein said spring has a first end engaging said second optical fiber adjacent said fifth end and a second end engaging said plug member second face.

4. A connection system, as defined in claim 1, further comprising a first optical fiber grip means adjacent a third face of said receptacle body member, whereby said third end of said first optical fiber is fixed with respect to said first face of said body member.

5. A connection system, as defined in claim 2, further comprising a first optical fiber grip means, to grip said first optical fiber adjacent a third face of said receptacle body member, whereby said third end of said first optical fiber is fixed with respect to said first face of said receptacle body member.

6. A connection system, as defined in claim 1, further comprising a second optical fiber grip means to grip said second optical fiber adjacent a fourth face of said plug member, whereby said second optical fiber is permitted to move along a longitudinal axis of said second optical fiber.

7. A connection system, as defined in claim 5, further comprising a second optical fiber grip means to grip said second optical fiber adjacent a fourth face of said plug member, whereby said second optical fiber is permitted to move along a longitudinal axis of said second optical fiber.

8. A connection system, as defined in claim 1, wherein said hollow ground pin has a U-shaped cross-section.

9. A connection system as defined in claim 7, wherein said hollow ground pin has a U-shaped cross-section.

10. A connection system, as defined in claim 8, wherein said hollow ground pin has an inside surface and an outside surface and said inside surface of said ground pin passes along said outside surface of said tube and said outside surface of said hollow ground pin engages said ground contact.

11. A connection system, as defined claim 9, wherein said hollow ground pin has an inside surface and an outside surface and said inside surface of said ground pin passes along said outside surface of said tube and said outside surface of said hollow ground pin engages said ground contact.

* * * * *